United States Patent
Geinoz et al.

(10) Patent No.: US 10,876,057 B1
(45) Date of Patent: Dec. 29, 2020

(54) WASTE TO ENERGY CONVERSION WITHOUT $CO_2$ EMISSIONS

(71) Applicant: M.E.D. Energy Inc., Monsey, NY (US)

(72) Inventors: Francois Ignace Geinoz, Bulle (CH); Marcel Cueni, Bulle (CH); Kameran Yakob, Carouge (CH)

(73) Assignee: M.E.D. Energy Inc., Monsey, NY (US)

( * ) Notice: Subject to any disclaimer, the term of this patent is extended or adjusted under 35 U.S.C. 154(b) by 0 days.

(21) Appl. No.: 16/600,539

(22) Filed: Oct. 13, 2019

(51) Int. Cl.
  *C10J 3/72* (2006.01)
  *C01B 3/50* (2006.01)

(52) U.S. Cl.
  CPC ............ *C10J 3/721* (2013.01); *C01B 3/50* (2013.01); *C10J 2300/0903* (2013.01); *C10J 2300/0946* (2013.01); *C10J 2300/1646* (2013.01); *C10J 2300/1653* (2013.01); *C10J 2300/1687* (2013.01); *C10J 2300/1815* (2013.01)

(58) Field of Classification Search
  CPC .................. C10B 2203/142; C10J 3/721
  See application file for complete search history.

(56) References Cited

U.S. PATENT DOCUMENTS

| | | | | |
|---|---|---|---|---|
| 4,322,222 A | * | 3/1982 | Sass | C10J 3/62 48/197 R |
| 4,968,325 A | * | 11/1990 | Black | C10J 3/482 422/143 |
| 5,225,044 A | * | 7/1993 | Breu | C10B 1/10 201/26 |
| 5,536,896 A | * | 7/1996 | Hesbol | A62D 3/37 110/237 |
| 5,899,175 A | * | 5/1999 | Manikowski, Jr. | B01J 8/025 123/3 |
| 6,209,494 B1 | * | 4/2001 | Manikowski, Jr. | B60K 6/48 123/3 |
| 2012/0006669 A1 | * | 1/2012 | Bronshtein | C10B 1/10 202/100 |
| 2013/0020188 A1 | * | 1/2013 | Mohamad | C10B 53/02 201/25 |
| 2014/0371385 A1 | * | 12/2014 | Verberne | C08K 3/36 524/571 |
| 2016/0039118 A1 | * | 2/2016 | Gehr | F27B 7/20 428/367 |
| 2016/0333274 A1 | * | 11/2016 | Franssen | B01J 23/72 |
| 2017/0218164 A1 | * | 8/2017 | Santacesaria | C10B 53/07 |
| 2017/0239634 A1 | * | 8/2017 | Dalluge | B01J 8/087 |
| 2017/0240814 A1 | * | 8/2017 | Dalluge | C10B 49/16 |
| 2018/0119951 A1 | * | 5/2018 | Verberne | B23K 35/0255 |
| 2019/0002323 A1 | * | 1/2019 | Benedek | B09B 3/00 |

* cited by examiner

*Primary Examiner* — Imran Akram

(74) *Attorney, Agent, or Firm* — James P. Demers; Cittone Demers & Arneri LLP

(57) ABSTRACT

The invention provides a method for energy extraction from municipal and mixed waste streams. The method employs a three-stage pyrolysis to produce a hydrogen-rich pyrolysis gas, which maximizes energy extraction without releasing carbon dioxide into the atmosphere.

5 Claims, 4 Drawing Sheets

ID_10,876,057_B1

WASTE TO ENERGY CONVERSION WITHOUT $CO_2$ EMISSIONS

FIELD OF THE INVENTION

The present invention generally relates to the oxidative processing of carbon-containing waste in order to extract the available chemical energy, with capture of the carbon dioxide produced.

BACKGROUND

Biomass (matter derived from plants and animals) contains a vast number of organic compounds in which reduced forms of carbon and hydrogen are the basic elements. Oxidation of these elements to water and carbon dioxide releases energy, which makes biomass a potential a source of energy.

Although the direct combustion of biomass as a source of energy (e.g., by burning wood for heat production) has largely been abandoned in the developed world, an analogous process is emerging in the form of energy crops dedicated to the production of fuels such as biogas, biodiesel and bioethanol. Also under development are methods for conversion of cellulosic waste into ethanol by fermentation. The conversion of biomass to fuel is regarded as "carbon neutral", in that atmospheric carbon dioxide, fixed by photosynthesis, is the source of the reduced carbon in the fuels.

A largely untapped source of energy is the biomass found in municipal waste (chiefly garbage and sewage sludge) and agricultural waste (stover and bagasse.) At the present time, three processes see limited use in extracting energy from these waste streams: the heat produced by combustion in incinerators can be used to energize steam-driven turbines for electricity production; anaerobic digestion or fermentation of some types of waste can be used to produce biogas (largely methane); and thermolytic methods (gasification and pyrolysis) can be used to generate hydrogen and oils from poorly-fermentable (chiefly lignocellulosic) waste.

Lignocellulosic biomass (cellulose, hemi-cellulose and lignin) is the most abundant organic material in the biosphere. It is abundant in waste streams from the forest industry and agriculture, and represents 40-60% of municipal solid waste. The thermolytic process for processing lignocellulosic material consists of a succession of treatments. An initial thermolysis between temperatures of 300 to 600° C. is carried out in the absence of oxygen, followed by high temperature gasification at 900-1300° C. in the presence of water vapor and oxygen, with net production of carbon monoxide and hydrogen (i.e., synthesis gas). This is an endothermic transformation, and the required energy can be obtained by oxidation of a fraction of the input material to carbon dioxide and water; alternatively, an external source of supplemental energy can be provided.

Additional hydrogen (and energy) can be obtained from synthesis gas via an exothermic "gas shift" reaction, $CO+H_2O \leftrightharpoons CO_2+H_2$, but the prior art practice has been to direct the synthesis gas to a Fischer-Tropsch unit for conversion to liquid hydrocarbons, or to methanol. The gas shift reaction is employed not to produce hydrogen per se, but to optimize the H2/CO ratio for conversion to liquid fuel or feedstock, with a net loss of energy content.

The drawbacks of incineration (combustion) include the difficulties of meeting increasingly stringent air pollution emission standards, and community resistance to the presence of incinerators in general. Chlorine-, nitrogen-, and sulfur-containing substances in the feed give rise to acidic products that must be captured and neutralized. The treatment of large volumes of exhaust gases requires a capital investment in large-scale equipment. The high moisture content of typical municipal waste is vaporized during incineration, at an energy cost of approximately 1,000 Btu/lb of water.

Pyrolyzers generate gas and oils by heating organic waste materials to high temperatures, ca. 400-500° C., but with poor energy efficiency and little control over the composition of the resulting materials. As with an incinerator, a pyrolyzer needs to boil off the water present in the feed, which is energetically demanding. Pyrolysis chambers need to be large in order to process waste on a useful scale, which leads to uneven heating of the waste, poor control over the chemistry, and poor quality of the end products.

Gasifiers operate with partial combustion of waste products. Air, oxygen, or steam is passed over the waste products in an amount that is sufficient to oxidize only a fraction of the combustible material. Gaseous products such as $CO_2$, $H_2O$, CO, $H_2$ and light hydrocarbons are produced, and the generated heat thermolyzes the remaining waste products into oils, gases, and carbonaceous material. Again, vaporization of the water in the input stream presents an energy cost. The gases produced are too voluminous to be stored and must be used in situ, or piped to a location where they can be used as a feedstock. Gasifiers also suffer from energy-consuming water-containing feeds.

Pyrolysis and gasification methods also have problems with sulfur- and chlorine-containing materials, which are transformed to mercaptans and organic chlorides.

Examples of prior art processes are found in U.S. Pat. Nos. 5,269,947, 5,360,553, and 5,543,061, which disclose a two-stage waste gasification process. In a first stage, the waste is heated to ca. 200-250° C. at up to 120 atmospheres pressure. Under these conditions the water content of the waste hydrolyses biopolymers such as fats and proteins to form a mixture of oils. In a second stage, the pressure is released, causing about half of the water to flash off as steam. The mixture is then heated further to drive off the remaining water, as the mixture breaks down into gaseous products, oils, and carbon, which are collected and separated.

U.S. Pat. No. 8,003,833 describes a similar process, carried out in a multi-stage manner with careful management, recovery, and use of heat energy. Soluble organics (sugars, glycerin, amino acids, etc.) are removed after the initial hydrolysis, in the form of a solution that can be used as fertilizer. Subsequent thermal processing yields marketable gases and oils, along with a carbon-rich biochar that can be com busted to provide energy needed to operate the plant.

The exploitation of biomass and municipal waste streams for the production of organic feedstocks, fuels, and energy, while thermodynamically viable, remains inefficient in practice, and the prior art processes release significant amounts of carbon dioxide to the atmosphere. There remains a need for a highly efficient process for waste-to-energy conversion, and a need for reduced carbon dioxide emissions from such processes.

BRIEF DESCRIPTION OF THE INVENTION

The invention provides a combination of processes which, taken together, can accept a variety of inputs, such as mixed municipal waste, sewage, used tires and oils, and agricultural and food-processing wastes, and produce energy with high efficiency and minimal emissions. The recycling of recoverable materials can be carried out in an easy and economical manner.

The invention relies on a combination of elements to achieve low emissions and high efficiency. One element is the use of induction heating of the reactors, which is rapid, efficient, and enables high temperatures with accurate control. A second element is the use of co-generated electricity, produced in a fuel cell using hydrogen gas generated by the process, to power the induction heaters.

Another element is the use of the Boudouard reaction (Equation 1)

$$C(s)+CO_2(g) \rightleftharpoons 2CO(g) \quad \text{(Eqn. 1)}$$

coupled with the water-gas shift reaction (Equation 2)

$$CO+H_2O \rightleftharpoons CO_2+H_2 \quad \text{(Eqn. 2)}$$

to effect the conversion of a large fraction of the chemical energy contained in the biomass into the chemical energy contained in elemental hydrogen. Through reliance on the oxidation of hydrogen, rather than carbon, the inefficiencies and environmental disadvantages of prior art carbon combustion methods can be avoided.

The hydrogen-rich gas thus produced enables the fuel cell to produce a considerable amount of electricity. The exhaust from the fuel cell is high-temperature steam, which may be used to generate additional electricity via a steam turbine.

In an alternative embodiment, rather than employing a fuel cell, the hydrogen is separated from the carbon monoxide and burned to generate high-pressure steam, from which electricity is generated, with the CO being returned as an input to the water-gas shift reaction.

All of the $CO_2$ produced by the process is contained, so that no energy-consuming absorption process is required, and as a result the process has essentially zero atmospheric emissions. A fraction of the captured CO2 is used as input to the Boudouard reaction; the remainder is suitable for use as a feedstock or fertilizer, or for sequestration by deep well injection.

DETAILED DESCRIPTION OF THE INVENTION

Figure 1:
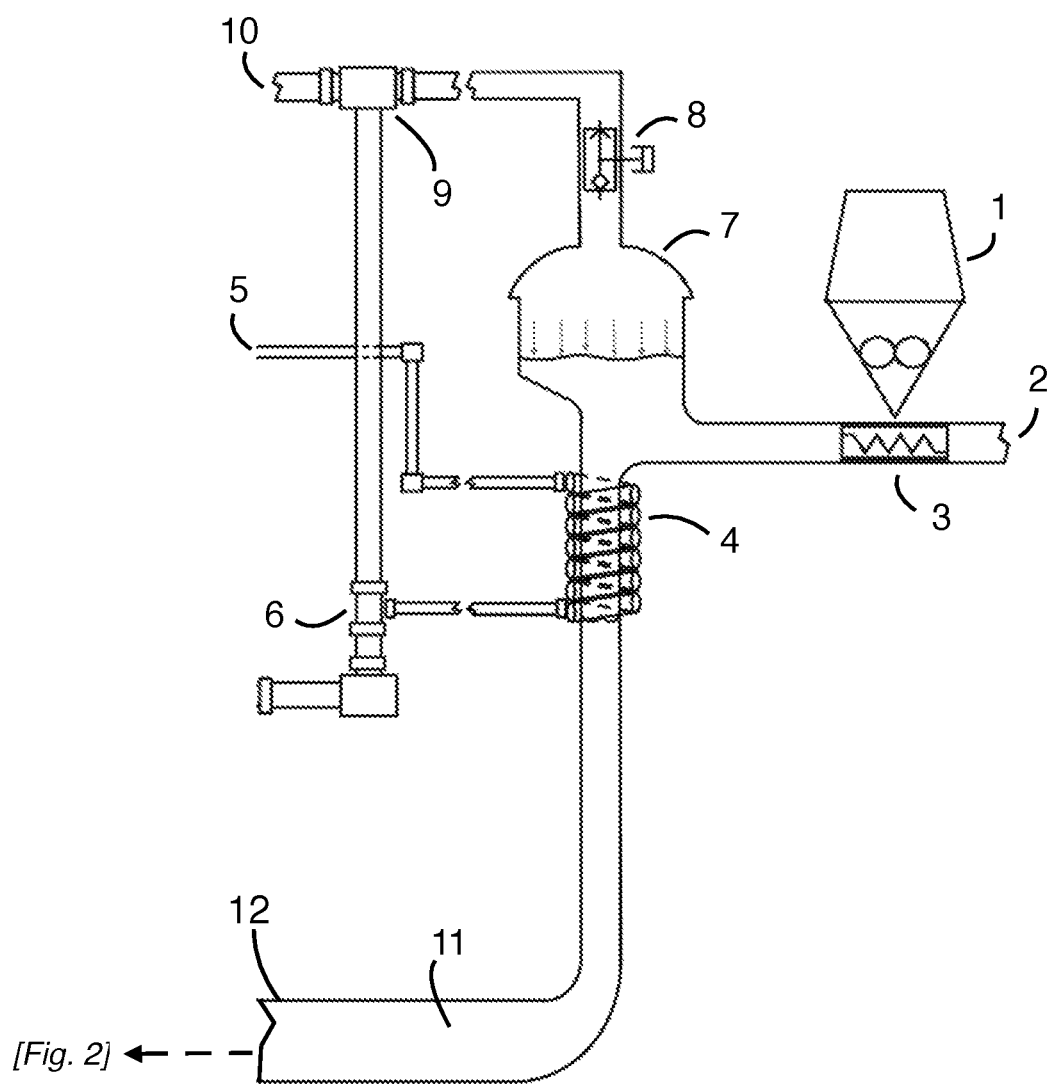
FIG. 1 is a diagram showing the initial shredding and drying of the incoming waste stream.

A key element of the present invention is the use of the Boudouard reaction (Equation 1), the conversion of carbon dioxide and solid carbon into carbon monoxide:

$$C(s)+CO_2(g) \rightleftharpoons 2CO(g) \quad \text{(Eqn. 1)}$$

The Boudouard equilibrium favors the formation of CO at high temperatures, shifting to the right at temperatures above ca. 700° C. In the process of the invention, the Boudouard equilibrium is coupled with the water-gas shift reaction (Equation 2) at to 600-900° C., which converts the CO to $CO_2$ and hydrogen:

$$CO+H_2O \rightleftharpoons CO_2+H_2 \quad \text{(Eqn. 2)}$$

The net result is shown in Equation 3:

$$C(s)+CO_2(g)+2H_2O \rightleftharpoons 2CO2+2H2 \quad \text{(Eqn. 3)}$$

The overall process transfers the potential chemical energy present in elemental carbon to the potential chemical energy found in hydrogen. This is accomplished by carrying out an initial low-temperature anaerobic pyrolysis, to produce syngas, bio-oil, and carbon char, and then recycling $CO_2$, carbon biochar, and water (end products of the overall process) back into the system prior to high-temperature pyrolysis and reforming. The bio-oil and syngas, and recycled char and $CO_2$, are fed to a medium-temperature pyrolysis unit operating at 600-900° C., at which temperature the gas mixture becomes enriched in CO via the operation of Eqn. 1. A portion of the bio-oil can be removed at this point for use as liquid fuel.

The CO-enriched gas is then compressed and fed, together with the bio-oil and additional water, to a high-pressure (20 atm), high-temperature (up to 1200° C.) reforming unit, where cracking of liquid hydrocarbons takes place, and any remaining methane is oxidized by water to CO and $H_2$ (Equation 4):

$$CH_4+H_2O \rightleftharpoons CO+3H_2 \quad \text{(Eqn. 4)}$$

The composition of the gas is further shifted toward $CO_2$ and $H_2$ via the water-gas shift reaction (Eqn. 2.) Through the above three-stage process, a large fraction of the chemical energy contained in the biomass is converted into the chemical energy contained in elemental hydrogen.

The hydrogen-rich gas is then fed to a fuel cell, along with oxygen or air, for generation of electricity. The exhaust from the fuel cell is high-temperature steam, which can be used to generate additional electricity via a steam turbine. In an alternative embodiment, the steam turbine may be powered by combustion of the hydrogen. This is a less efficient process, but it avoids the capital investment and maintenance costs of the fuel cell.

The unburned gas from the fuel cell, consisting of CO and CO2, is compressed to 40 atm and fed to a separator, where it is cooled to liquefy the $CO_2$. Gaseous CO is separated and returned to the high temperature reforming unit, while the liquid $CO_2$ is sent to expansion (evaporation) units. Part of the now-gaseous $CO_2$ is returned to the medium-temperature pyrolysis unit, and the remainder, still at about 20 atm, constitutes the $CO_2$ effluent of the overall process. The expansion units serve as heat sinks for the coolant used to cool the separator.

Figure 4:
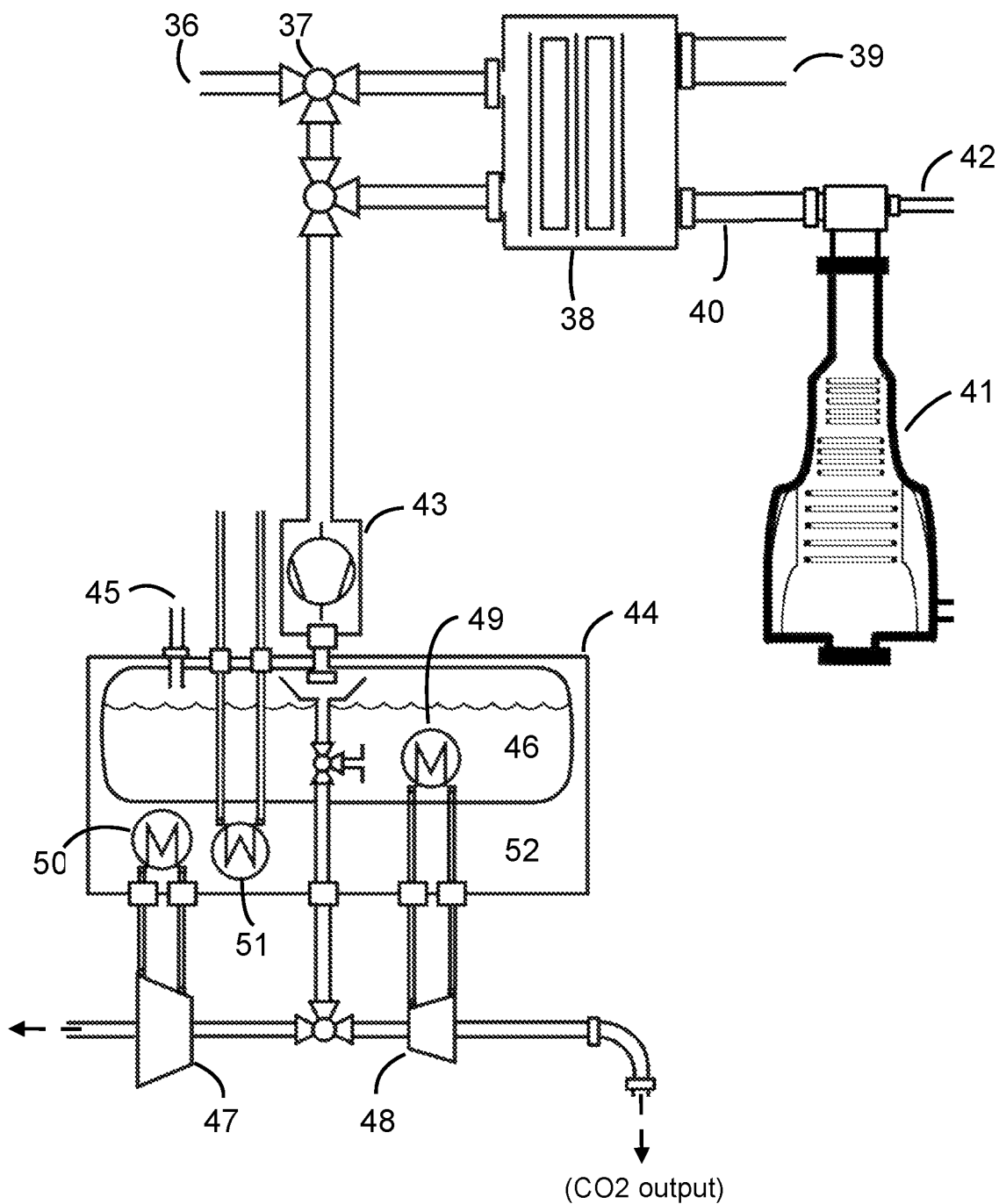
FIG. 4 is a diagram showing the fuel cell, turbine, and gas separator of the process.

The invention will now be described in greater detail. Turning to FIG. 1, mixed solid waste (municipal garbage, dried sludge, agricultural bagasse, etc.), preferably freed of ferrous metals and aluminium, is fed to a shredder 1. Liquid waste (sewage, concentrated sludge, etc.) is piped in at intake 2, and combined with the output of the shredder at mixer 3, which may be for example an auger for both mixing and propelling the waste stream. A heater 4 raises the temperature of the waste stream to about 140° C. in order to dry the waste. Pressurized steam is preferably used to energize the heater, and in the embodiment shown the steam enters at 5, with the condensate exiting at 6, where it joins the flow of condensate exiting from the steam turbine (FIG. 4, described below). The steam is preferably provided by the hot exhaust from the fuel cell, as described below. Steam produced by the drying waste collects in chamber 7, where it serves to pressurize the waste and ensure that it flows in the proper direction. The pressure is controlled by valve 8; steam released through 8 is condensed, combined with the heater and turbine condensates at 9, and exits at 10 for use elsewhere in the system. The dried waste 11 exits through transport pipe 12 and proceeds to the pyrolyzer units (FIG. 2.)

Figure 2:
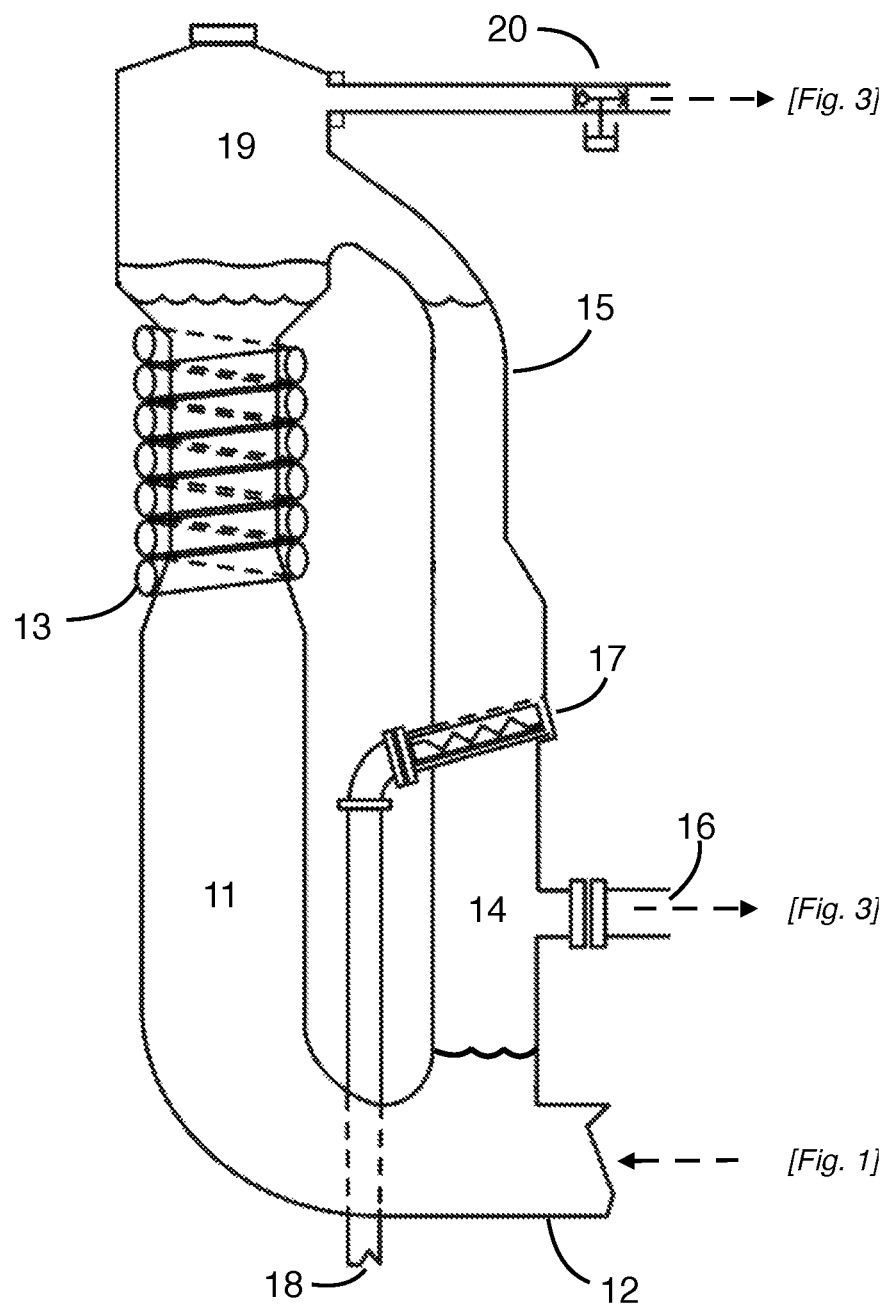
FIG. 2 is a diagram showing the low-temperature pyrolysis stage of the process.
Figure 3:
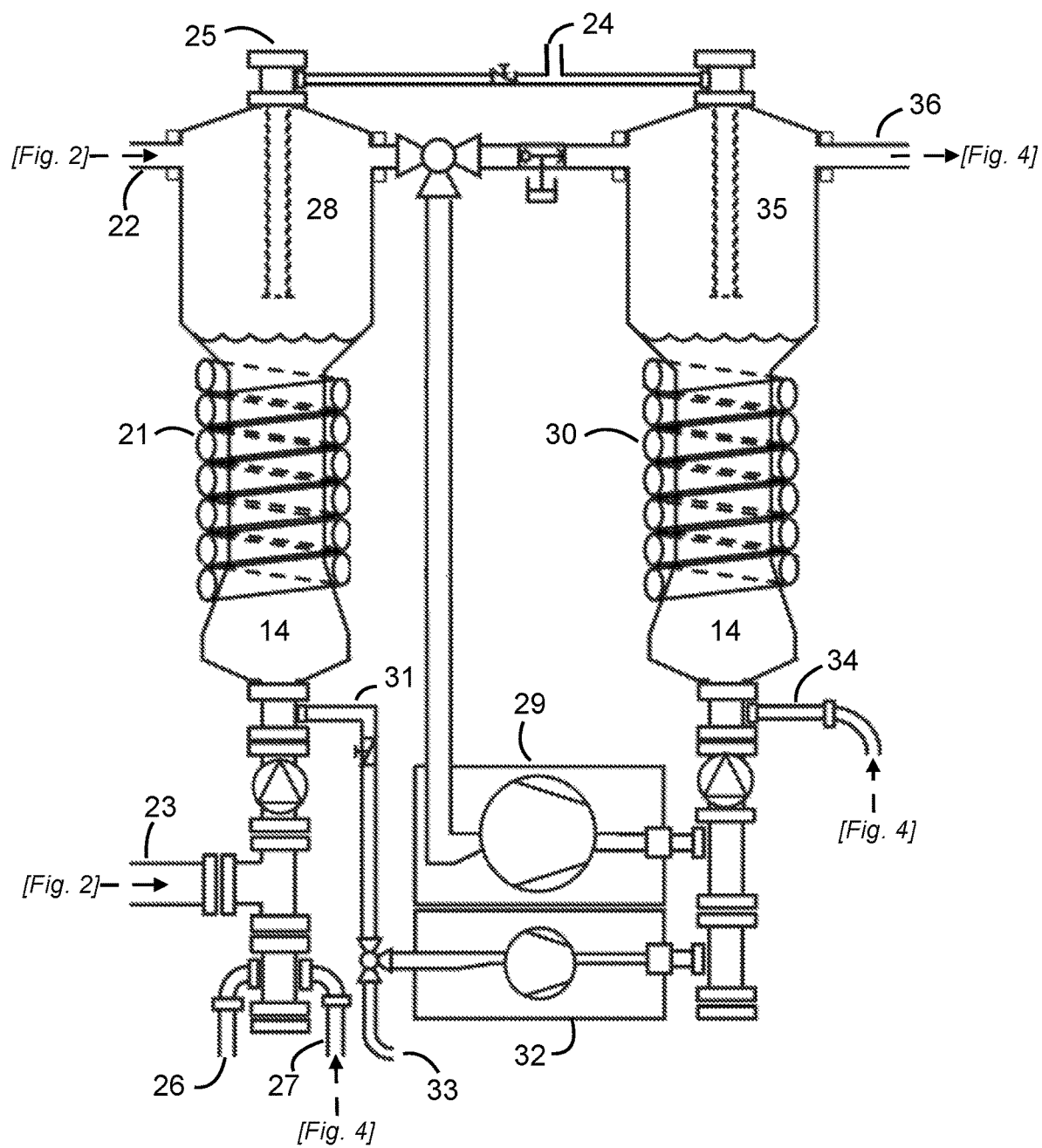
FIG. 3 is a diagram showing the medium- and high-temperature pyrolysis stages of the process.

Referring now to FIG. 2, waste 11 arrives at the distal end of transport pipe 12, and flows upward to the induction-heated low-temperature pyrolyzer unit 13. The dry waste is suspended, throughout the system, in bio-oil 14, which serves as the heat transfer fluid and reaction medium for the pyrolysis reactions. The pyrolyzer 13 is operated anaerobically, at 300° C. to 600° C., preferably at about 500° C. At this temperature, as is known in the art, organic materials thermally break down into char, gases and oils, yielding bio-oil 14 which flows into reservoir 15. Bio-oil is removed at 16 at the same rate it is formed, so as to maintain the waste 11 within the heated zone of the pyrolyzer. A portion of the carbon in the waste is reduced to biochar, or coke, which is carried over with the bio-oil into reservoir 15. A solids separator 17 collects the bio-char, along with inorganic solids (ash, silica, glass and metal fragments, etc.) that are present in or generated from the waste. The solid wastes are collected at 18. Carbon char is separated from the collected solids, and is returned to the medium temperature pyrolyzer (FIG. 3.) The syngas 19 produced by the reaction is largely $H_2$ and CO, with lesser amounts of $CO_2$ and $CH_4$. It is removed via valve 20 and also passes on to the medium-temperature pyrolyzer.

The above description is intended to be an outline of one embodiment of a portion of the invention. Those skilled in the art will appreciate that other methods of processing, drying, transporting, and anaerobically pyrolyzing biomass and organic waste to produce bio-oil, bio-char, and bio-gas are known in the art (see M. I. Jahirul et al., "Biofuels Production through Biomass Pyrolysis—A Technological Review." *Energies* 2012, 5:4952-5001; doi:10.3390/en5124952), and any of the known methods are contemplated to be adaptable for use at this stage of the presently-described process. Precise operating details, such as operating temperature, residence time, and throughput, will be adjusted for optimum performance as the composition of the waste stream varies overtime. Agricultural wastes, in particular, are likely to vary with the seasons.

Turning to FIG. 3, the medium- and high-temperature pyrolysis units are illustrated. Bio-gas exiting from valve 20 (FIG. 2) enters the medium-temperature pyrolyzer 21 via port 22. Bio-oil 14 exiting the reservoir at 16 (FIG. 2) enters the bottom of the medium-temperature pyrolyzer at 23. Water enters via tube 24, and bio-char (carbon) recovered from the low-temperature pyrolyzer is introduced at port 25. A separate feed of waste oil (from fryers, auto maintenance, etc.) may be separately fed into the system at 26, and carbon dioxide from the $CO_2$ separator (FIG. 4) is introduced at 27.

The pyrolyzer 21 is operated at a pressure of 1-5 atm, between 600° C. and 900° C. Under these conditions, the Boudouard reaction (Eqn. 1) oxidizes the added carbon to carbon monoxide, with concomitant reduction of the added $CO_2$ to additional CO. Due to the presence of water, a water-gas shift reaction (Eqn. 2) then takes place, with the net production of additional hydrogen gas. The hydrogen-rich syngas 28 is then compressed by compressor 29 to about 20 atm before being fed to the high-temperature pyrolyzer 30. Bio-oil is removed at 31, pressurized to about 20 atm at 32, and also fed to the high-pressure pyrolyzer 30. Excess bio-oil is drawn off at 33, for use as a fuel or feedstock. Water is introduced to the high-temperature pyrolyzer via 24, and recycled CO from the CO2 separator (FIG. 4) is introduced at 34.

The high-temperature pyrolzyer is operated at a pressure of about 20 atm, at 800° C. to 1200° C., preferably at a temperature of about 900° C. Under these conditions, hydrocarbon cracking and steam reforming (Equation 4) take place, further enriching the gas phase in hydrogen, and the water-gas shift reaction converts the CO thus produced to yet more hydrogen. The net result of these processes is Equation 5:

$$CH_4 + 2H_2O \leftrightharpoons CO_2 + 4H_2 \qquad \text{(Eqn. 5)}$$

The gases 35, which are at this point principally hydrogen and $CO_2$, are drawn away through outlet 36, and delivered to the fuel cell (FIG. 4).

Turning now to FIG. 4, the pyrolyzer gas outlet 36 leads to valve 37, which in normal operation passes the gases to fuel cell 38. Fuel cell 38 is preferably a solid oxide fuel cell (SOFC) designed for high-pressure and high-temperature operation; such units are known in the art and are commercially available. Air or oxygen is fed to the cell via inlet 39. Hot steam issues at 40, and is used to drive turbine 41 for generation of additional electricity. A portion of the steam is diverted at 42 to the heater 4 (FIG. 1) that dries the incoming waste stream, and the steam may be used as a thermal energy source elsewhere in the installation as needed.

Hybrid systems combining SOFC fuel cells and turbines powered by the SOFC exit gases are known in the art; see U. Damo et al., "Solid oxide fuel cell hybrid system: A detailed review of an environmentally clean and efficient source of energy." *Energy* 168:235-246 (2019) doi:10.1016/j.energy.2018.11.091. Integrated SOFC/turbine systems have become commercially available; an example is the MEGAMIE™ series of integrated systems manufactured by Mitsubishi Hitachi Power Systems, Ltd. of Yokohama, Japan. It is contemplated that commercial integrated systems can be readily adapted for use in the process of the present invention.

A mixture of carbon dioxide and carbon monoxide remains after the hydrogen is oxidized in the fuel cell, and these gases are compressed at 43 to about 40 atm and passed to the gas separator 44. The $CO_2$, still under 40 atm pressure, is cooled to about 4° C., at which point it liquefies, permitting the gaseous CO to be drawn away at 45 and returned to the high-temperature pyrolyzer at 34 (FIG. 3). The liquid $CO_2$ 46 is sent on to expanders 47 and 48. Expander 47 discharges $CO_2$ at a pressure of about 1 atm; this gas is recycled to the medium-pressure pyrolyzer 21 (FIG. 3). Expander 48 discharges $CO_2$ at a pressure of about 20 atm. This gas is pipeline-ready, and can be used as a feedstock for chemical processes, for fertilizer production, or for enhanced oil recovery or underground sequestration. The costs and inefficiencies of $CO_2$ capture are entirely avoided, due to the closed nature of the system of the invention.

The expansion of the $CO_2$ in expanders 47 and 48 is accompanied by considerable cooling. This is captured by heat exchangers 49 and 50, respectively, which serve to cool and liquefy the compressed $CO_2$. A third heat exchanger 51, immersed in coolant 52, provides cooling for reactors, condensers, and other equipment as desired.

Of the energy supplied by hydrogen, only about 35% is used by the chemical processes of the invention, and the addition to the pyrolyzers of additional water makes it possible to improve upon this balance. The remainder is available for electricity production.

The $CO_2$ produced is easily transmitted to agriculture in liquefied form, for dissolution in irrigation water. The use of carbonated water for irrigation is known to increase yields, particularly in greenhouse environments, but the method has not been widely employed to date. The availability of piped-in $CO_2$ from installations of the system of this invention will make the technology readily available.

The present invention is sufficiently clean and efficient to make "mining" of landfills for their energy content a viable enterprise, and could make it possible to reclaim land currently given over to the storage of trash.

We claim:

1. A process for obtaining energy from waste, which comprises:
   (a) drying the waste;
   (b) anaerobic pyrolysis of the waste at 300° C. to 600° C. to produce syngas, char, and bio-oil;
   (c) anaerobic pyrolysis of the syngas in the presence of a portion of the bio-oil, a portion of the char, additional carbon dioxide, and added water, at 600° C. to 900° C., to produce a gas with increased hydrogen content and a product oil;
   (d) anaerobic pyrolysis of the gas and product oil produced at (c), in the presence of additional water and additional carbon monoxide, at 800° C. to 1200° C. and about 20 atmospheres pressure, to further increase the hydrogen content of the gas;
   (e) separating hydrogen, carbon dioxide and carbon monoxide from the gas produced at (d);
   (f) using the separated carbon monoxide as the additional carbon monoxide in step (d); and
   (g) using the separated carbon dioxide as the additional carbon dioxide in step (c).

2. The process of claim 1, further comprising:
   (h) fuelling a steam generator by combusting the hydrogen separated at (e).

3. A process for obtaining energy from waste, comprising:
   (a) drying the waste:
   (b) anaerobic pyrolysis of the waste at 300° C. to 600° C. to produce syngas, char, and bio-oil:
   (c) anaerobic pyrolysis of the syngas in the presence of a portion of the bio-oil, a portion of the char, additional carbon dioxide, and added water, at 600° C. to 900° C., to produce a gas with increased hydrogen content and a product oil;
   (d) anaerobic pyrolysis of the gas and product oil produced at (c) in the presence of additional water and additional carbon monoxide, at 800° C. to 1200° C. and about 20 atmospheres pressure, to further increase the hydrogen content of the gas;
   (e) fuelling a fuel cell with the gas produced at (d);
   (f) driving a steam generator with steam produced by the fuel cell;
   (g) separating carbon dioxide and carbon monoxide from the effluent gases of the fuel cell;
   (h) using the carbon monoxide as the additional carbon monoxide in step (c);
   (i) using a portion of the carbon dioxide as the additional carbon dioxide in step (b).

4. The process of claim 3, wherein the fuel cell is a solid oxide fuel cell (SOFC).

5. The process of claim 4, wherein the SOFC and steam generator are an integrated SOFC/turbine system.

* * * * *